United States Patent
Piemonte et al.

(10) Patent No.: US 9,754,397 B1
(45) Date of Patent: Sep. 5, 2017

(54) SYSTEMS AND METHODS FOR CONTEXTUAL AUGMENTED REALITY SHARING AND PERFORMANCE

(71) Applicant: Mirage Worlds, Inc., San Francisco, CA (US)

(72) Inventors: Patrick S. Piemonte, San Francisco, CA (US); Ryan P. Staake, Brooklyn, NY (US)

(73) Assignee: MIRAGE WORLDS, INC., San Francisco, CA (US)

( * ) Notice: Subject to any disclaimer, the term of this patent is extended or adjusted under 35 U.S.C. 154(b) by 0 days.

(21) Appl. No.: 15/482,644

(22) Filed: Apr. 7, 2017

(51) Int. Cl.
| | |
|---|---|
| *G09G 5/00* | (2006.01) |
| *G06T 11/60* | (2006.01) |
| *H04L 29/06* | (2006.01) |
| *H04W 4/02* | (2009.01) |
| *G06K 9/62* | (2006.01) |
| *G06F 3/00* | (2006.01) |
| *G06Q 20/30* | (2012.01) |
| *H04W 84/12* | (2009.01) |

(52) U.S. Cl.
CPC .............. *G06T 11/60* (2013.01); *G06F 3/005* (2013.01); *G06K 9/6202* (2013.01); *G06K 9/6215* (2013.01); *G06Q 20/30* (2013.01); *H04L 67/38* (2013.01); *H04W 4/021* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,391,424 B2* | 6/2008 | Lonsing | G06T 15/00 |
| | | | 345/633 |
| 8,810,599 B1* | 8/2014 | Tseng | G06T 7/0018 |
| | | | 340/435 |

(Continued)

OTHER PUBLICATIONS

Lemley, "Law, Virtual Reality, and Augmented Reality," Mar. 15, 2017 (available at ssrn.com/abstract=2933867).

(Continued)

*Primary Examiner* — David H Chu
(74) *Attorney, Agent, or Firm* — Ryan Alley IP

(57) ABSTRACT

Methods, hardware, and software perform augmented reality created from a separate source in context with, such as synchronized and positioned in, captured media, so as to replicate a similar augmented reality at a different instance. A computer processor in a network of communications devices handles a combination of augmented reality information, anchor information that provides the context-matching, limitation information that controls if such information is transmitted or acted upon, and captured media information. The computer processor compares the anchor information with the media to identify triggering media and how augmented reality elements should appear in context with such media. If successful, the augmented reality is performed on a communications device based on the media. Augmented reality can thus be performed in strict reference to actually-captured media, in only desired or restricted conditions, and information transmission and processing to enable the same may be undertaken only at useful, resource-conserving instances.

19 Claims, 4 Drawing Sheets

(56) References Cited

U.S. PATENT DOCUMENTS

| | | | |
|---|---|---|---|
| 8,839,121 B2* | 9/2014 | Bertolami | G06F 3/011 |
| | | | 345/633 |
| 2011/0102678 A1* | 5/2011 | House | H04N 9/75 |
| | | | 348/584 |
| 2012/0026354 A1 | 2/2012 | Hamada | |
| 2013/0169680 A1* | 7/2013 | Chien | G06F 3/04815 |
| | | | 345/633 |
| 2013/0178257 A1* | 7/2013 | Langseth | G06T 17/05 |
| | | | 463/4 |
| 2015/0046296 A1* | 2/2015 | Hart | G06T 19/006 |
| | | | 705/27.2 |
| 2015/0109481 A1* | 4/2015 | Hayakawa | H04N 5/265 |
| | | | 348/239 |
| 2015/0138234 A1* | 5/2015 | Yoon | G06T 19/006 |
| | | | 345/633 |
| 2015/0288944 A1* | 10/2015 | Nistico | H04N 13/0022 |
| | | | 345/156 |
| 2015/0302650 A1* | 10/2015 | Abdelmoati | G06F 3/041 |
| | | | 345/633 |
| 2016/0004934 A1 | 1/2016 | Ebata et al. | |
| 2016/0005233 A1* | 1/2016 | Fraccaroli | G02B 27/0172 |
| | | | 345/633 |
| 2016/0112479 A1* | 4/2016 | Jayaraj | G06T 19/006 |
| | | | 345/633 |
| 2016/0253745 A1* | 9/2016 | Lee | G06Q 30/06 |
| | | | 705/27.2 |
| 2016/0284131 A1* | 9/2016 | Koga | G06T 19/006 |
| 2017/0046878 A1 | 2/2017 | Dobslaw | |
| 2017/0069143 A1* | 3/2017 | Salter | G06F 3/013 |
| 2017/0084082 A1* | 3/2017 | McTaggart | G06T 19/006 |
| 2017/0094262 A1 | 3/2017 | Peterson et al. | |
| 2017/0124713 A1* | 5/2017 | Jurgenson | G06T 19/006 |

OTHER PUBLICATIONS

Held, "Learning to Track at 100 FPS with Deep Regression Networks," 2016, Stanford University (available at arxiv.org/abs/1604.01802).

Adario Strange, "Hunt for historical figures with this augmented reality app from IBM and the NY Times," Jan. 5, 2017, Mashable (available at mashable.com/2017/01/05/augmented-reality-outthink-hidden-app/#x9YuefXK5aq7).

T Brand Studio AR, Feb. 1, 2017, iTunes (available at itunes.apple.com/us/app/t-brand-studio-ar-augmented/id1184006872).

* cited by examiner

SYSTEMS AND METHODS FOR CONTEXTUAL AUGMENTED REALITY SHARING AND PERFORMANCE

BACKGROUND

Augmented reality applications may use a simple overlay of graphical/animated subject matter on live or recorded video or still images. In these simple systems, a user or application may position a static graphic, text, or other visual element superimposed on the underlying video or image. Other augmented reality applications may blend augmented reality subject matter with underlying visual data, or at least use the underlying visual data to position the augmented reality subject matter. For example, a human face may be recognized in a video feed or image still, and the augmented reality application may apply coloration, designs, distortions, etc. that track only the face in the video or image, so as to further the augmented reality effect that the face actually has such characteristics.

Aside from human faces, other objects and/or image information for tracking and/or formatting augmented reality subject matter may be used. For example, a QR code may be recognized as a target for augmented reality overlay, both in subject matter and positioning of the augmented reality subject matter. Similarly, a zoom level of a video feed may determine sizing and/or resolution of augmented reality subject matter on the zoomed video. Still further, augmented reality subject matter may be added and/or formatted after video or image capture, following further processing of the video and/or image data.

Augmented reality subject matter is typically provided by the application receiving the visual data. For example, an application may offer a set of stickers, labels, drawn text, cartoons, etc. that can be applied to live or captured visual information and then saved together with the visual data as an augmented reality visual. Or, for example, a set of facial overlays, game images and objectives, graphical head-ups displays or GUIs, etc. can be offered by augmented reality applications for overlay/intermixing with visual data to created augmented reality visuals for users. Augmented reality subject matter may be geofenced or chronofenced, where various labels, game characters, filters, distortions, and/or any other augmented reality application may only be available at particular locations and times. For example, a picture overlay of "San Antonio Tex." or "Spurs 24—Pacers 32" may be available only when a user is determined to be in San Antonio through location services on a mobile device, and/or only during a Spurs-Pacers game when the score is 24 to 32.

SUMMARY

Example embodiments and methods perform augmented reality in context with underlying captured media. Example embodiments include computer networks with one or more users that can receive augmented reality information and media captured at a separate instance. Through a computer processor in the network configured with example methods, augmented reality can be selectively performed using the captured media. One or more communications devices in the network may be configured to capture the media and/or perform the augmented reality information therein.

Example methods handle several forms of information with a computer processor to ultimately perform augmented reality, including augmented reality information having perceivable elements to be added to underlying media, anchor information to properly place or time or otherwise configure the augmented reality information in the underlying media, origin and limitation information to control when and how information is exchanged and compared, if at all, and the actual media information. The augmented reality information and anchor information may be received at one instance, as combined media representing the augmented reality or as distinct pieces of information. The actual media may be received at another instance, potentially from a wholly distinct user and/or time. The computer processor compares the anchor information with the media to determine if the anchor information matches, is found in, or otherwise triggered by the media. If the comparison is favorable, the augmented reality information is performed in the media, in the manner dictated by the anchor information, so as to recreate the augmented reality in the context of the media, even in real time with the capture of the media. The comparison and/or receipt of the actual media may be conditioned upon a user or device satisfying other origin limits, such as being within a designated geographical area that matches the anchor, being controlled by a particular authenticated user, being executed at a particular time, being executed at and while a particular event is occurring, having been paid for, etc. In this way, potentially burdensome media and augmented reality information transfer, comparison, and performance together can be reserved for particular context-matching circumstances, preserving example embodiment network and communication devices resources.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Figure 1:
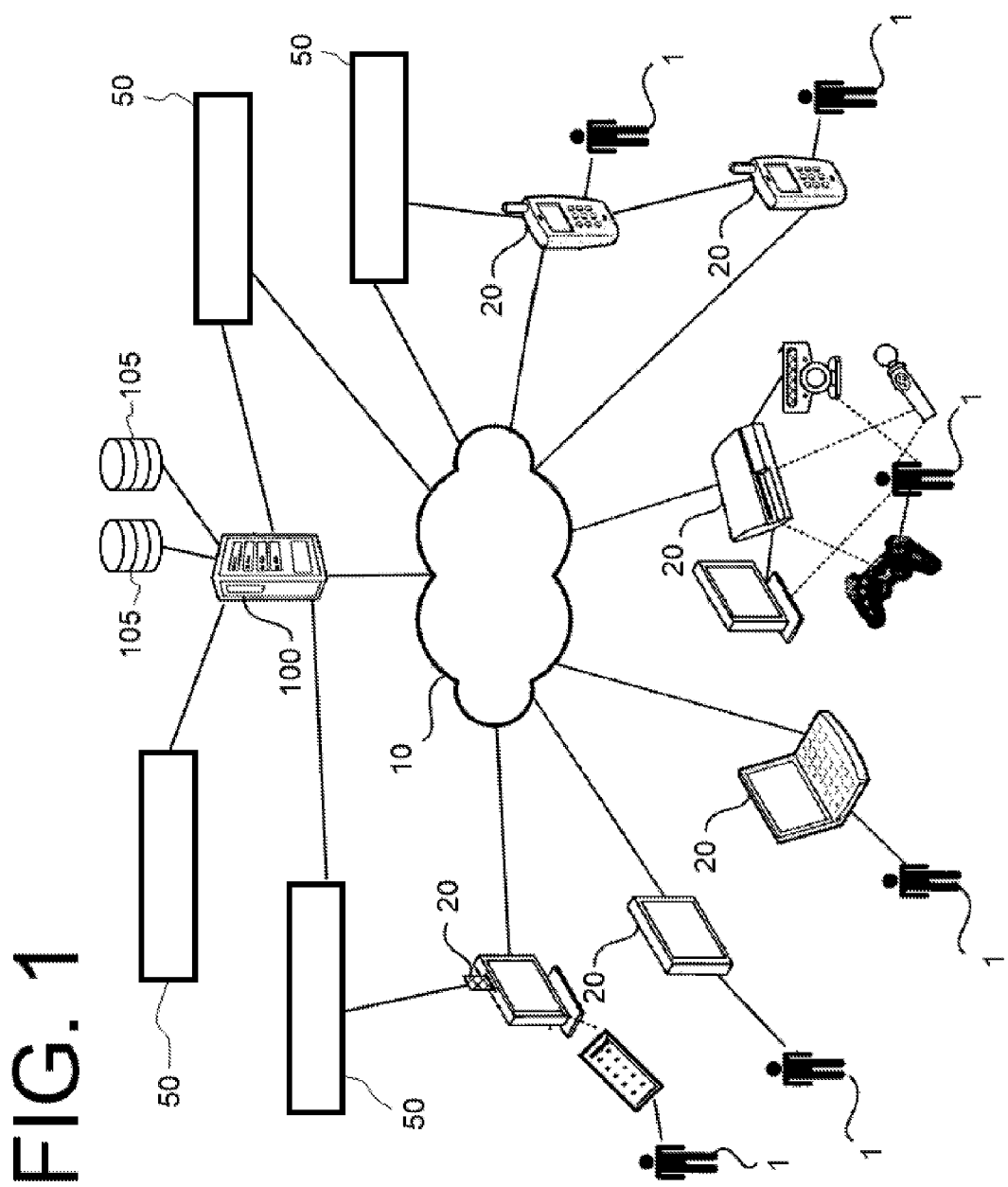
FIG. 1 is an illustration of an example embodiment network configured to share and perform augmented reality.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that augmented reality offers a useful way of communicating additional information about media typically encountered on communication devices. However, augmented reality is conventionally available only in connection with very specific objects, such as QR codes or predefined files from a single source, that define how augmented reality elements should be displayed, often without any contextual connection with the underlying object. Thus, the inventors have newly recognized a problem where augmented reality does not contextually describe or associate with other commonly-encountered media, where it is more useful. Similarly, the inventors have recognized that it is extremely burdensome in computing environments to transmit and compare the amount of data required to offer augmented reality in connection with specific media, especially in a potentially unlimited network such as the Internet, because of the size of such media and the computational requirements in triggering and presenting a particular augmented reality, out of millions or more that could be offered, in connection with appropriate objects. To overcome these newly-recognized problems as well as others, the inventors have developed example embodiments and methods described below to address these and other problems recognized by the Inventors with unique solutions enabled by example embodiments.

The present invention is devices, software as stored or executed on tangible computer-readable media, and methods for sharing and performing contextual augmented reality. In contrast to the present invention, the few example embodiments and example methods discussed below illustrate just a subset of the variety of different configurations that can be used as and/or in connection with the present invention.

FIG. 1 is an illustration of an example embodiment network useable to deliver augmented reality content among and to multiple users. As shown in FIG. 1, a network 10 provides communicative connection among several different communications devices 20. For example, network 10 could be the Internet or another TCP/IP protocol network such as a WAN or LAN or intranet, or network 10 could be a wireless cell network operating on CDMA, WiFi, Bluetooth, GPS, near field communications, etc. Network 10 may thus be any structure or protocol that allows meaningful communicative connections between communications devices 20 and/or other information sources. Communications devices 20 may be directly communicatively connected among one another to sideload or directly transmit data between devices 20, such as through NFC, WiFi, Infrared, etc. Although communications devices 20 are shown in connection with a network 10, it is understood that devices 20 and ultimately users 1 may be directly connected to each other, and potentially only each other, through such sideloading or direct communications and/or only directly connected to content providers 50 without use of network 10.

One or more content providers 50 connect to one or more user devices 20, either directly or via network 10 or another network. Providers 50 can be any content, media, functionality, software, and/or operations providers for communication devices 20. For example, providers 50 may include mobile software developers with server backends, application hosts, and/or access portals for downloading and running software and/or streaming media on devices 20. Or providers 50 may include a network operator, such as a cellphone and mobile data carrier operating network 10 and controlling access rights of users 20 as well as general operation of network 10. Or providers 50 may be application storefronts providing search, download, operations connectivity, updating, etc. for apps on communication devices 20. Or providers 50 may be a website or ftp server offering downloadable files or other content that may be displayed or otherwise consumed through devices 20. Although providers 50 are mostly shown clustered around network 10 for connectivity to devices 20, it is understood that any direct or indirect connection between any provider 50 and any device 20 is useable in example embodiments.

Example embodiment application host 100 provides storage and delivery of augmented reality content and/or potentially other networking functionality among devices 20 and ultimately users 1, optionally through providers 50 and/or network 10. For example, host 100 may be connected to several different devices 20 through a network 10. Or application host 100 may be connected directly to, and controlled by, a content provider 50, to provide augmented reality information and/or functionality among devices 20. Still further, host 100 may connect directly to a device 20. This flexibility in networking can achieve a variety of different augmented reality functionalities, content control, and commercial transactions among potentially independent hosts 100, providers 50, network 10, and/or devices 20.

As shown in FIG. 1, example embodiment application host 100 may be connected to or include computer hardware processors, server functionality, and or one or more databases 105, which may store augmented reality information, functionality, and/or user or network profile or operational data for successful interaction among various networked components. In this way, host 100 may accept, persist, and analyze data from user communications devices 20, network 10, and/or providers 50. Although shown as separate elements in FIG. 1, it is understood that host 100 may be integrated with content provider 50, databases 105, and/or network 10, such as an application portal accessed through a mobile app or program on devices 20 that provides application updating, augmented reality content, other application functionality, login, registration, ecommerce transactions, instructions, technical support, etc., like a full-service application portal available from a computerized user device 20 in order to execute all aspects of example methods discussed below.

Figure 2:
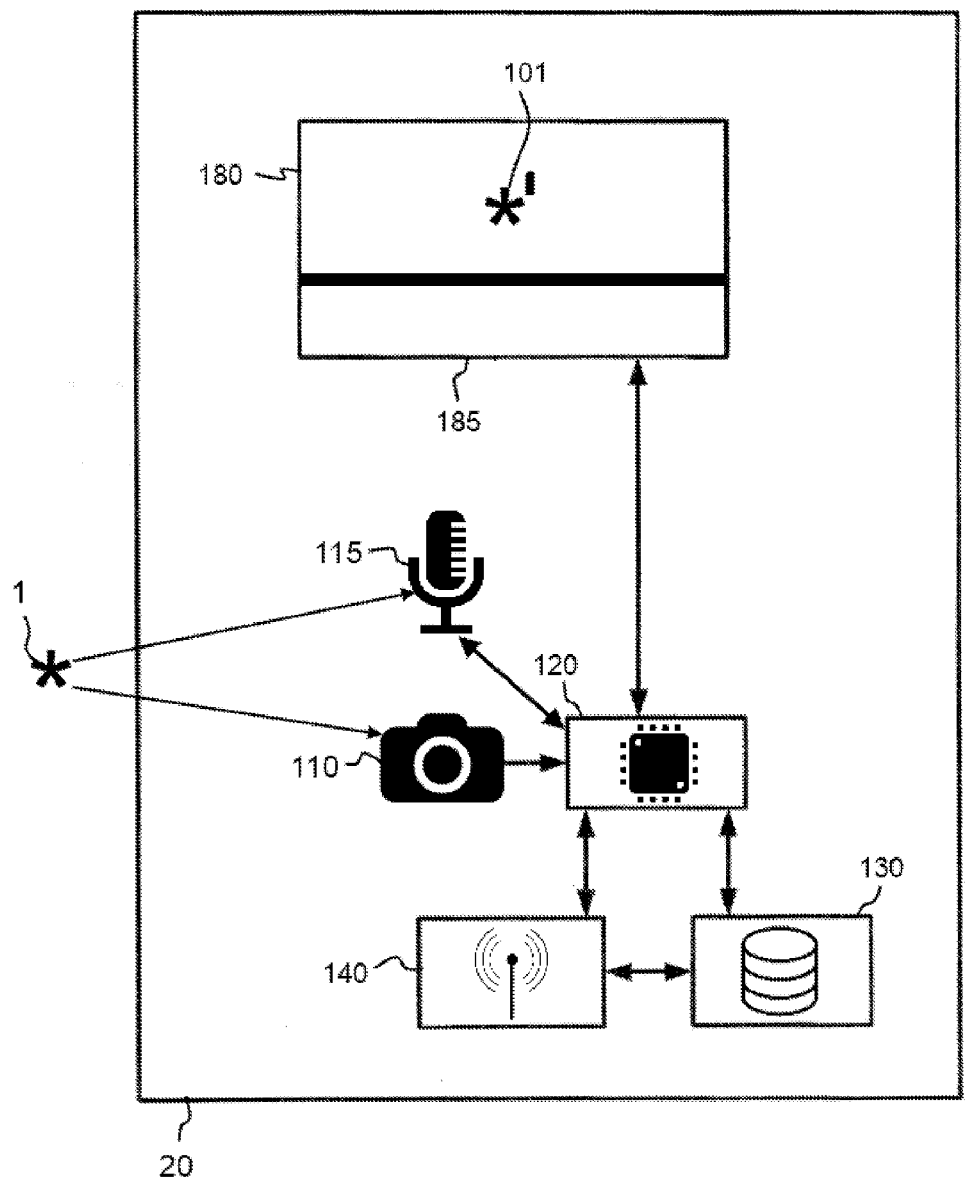
FIG. 2 is an illustration of an example embodiment communications device configured to share and perform augmented reality.

As used herein, "communications device(s)"—including user communications devices 20 of FIG. 2—is defined as processor-based electronic devices configured to receive, transmit, create, and/or perform augmented reality content. Information exchange, and any communicative connect, between communications device must include non-human communications, such as digital information transfer between computers. As used herein, "augmented reality"—including augmented reality 101 of FIG. 2—is defined as subject matter including a mixture of both real-life audio, visual, tactile, and/or other sensory media—such as a real-time video feed 1 with audio captured without intentional modification by a camera and microphone—and added audio, visual, tactile, and/or other sensory subject matter—such as an extraneous graphic, mask, text, animation, filter, noise, etc.—that is explicitly based on the underlying real-life media, such as by positional tracking of the underlying real-life subject matter, for example.

FIG. 2 is a schematic of an example embodiment user device communications 20 illustrating components thereof that may permit interaction with augmented reality 101 as described in example methods below. For example, communications device 20 may include a camera package 110 including a lens and image sensor, microphone 115, a computer processor 120, persistent and/or transient storage 130, external communications 140, display screen 180, and/or input device and input sensors 185. Although elements are shown within a single device 20, it is understood that any element may be separate and connected through appropriate communications such as an external bus for a peripheral or wired or wireless connection.

Processor 120 may include one or more computer processors connected to and programmed or otherwise configured to control the various elements of example embodiment device 20. Processor 120 may further be configured to execute example methods, including creating, transmitting and performing augmented reality in accordance with user input, and controlling display 180 and sensor 185/camera 110/microphone 115, for example. Processor 120 can be any computer processor, potentially with associated processor cache, transient memory, video buffer, etc., configured or programmed to processes augmented reality content. Processor 120 may further process any input to device 20, including visual, tactile, and/or audio information received from microphone 115, camera 110, a vibration-sensitive transducer, etc., for augmented reality creation, transmission, and/or performance. Processor 120 may also receive sensor information from sensors 185, e.g., touch or cursor information, and process the same as user interaction or input. Processor 120 may further execute software or include configured hardware that allows for execution of example methods discussed below.

Storage 130 may be a dedicated data storage drive or may be a partition of a general data store in which augmented reality information, origin or limitation information, application information, and/or device operations and raw data can be saved. Storage 130 may be, for example, random access memory (RAM), read only memory (ROM), programmable read only memory (PROM), erasable programmable read only memory (EPROM), electronically erasable programmable read only memory (EEPROM), flash memory, a hard disk, a processor cache, optical media, and/or other computer readable media.

Camera 110 may include one or more lenses and/or apertures that may be controlled by actuators that move the lenses and apertures among different positions to focus captured optical data. Similarly, camera 110 may adjust focus digitally or in response to user input defining focus locations in the scene being captured. Camera 110 may include image sensor elements such as a charge coupled device (CCD) array, a photodiode array, or any other image sensing device that receives light, potentially via the lens, and generates image data in response to the received light. Camera 110 may include a light to aid in reflection and/or focusing laser. Camera 110 may be further configured to obtain or adjust image information such as focus, zoom, white balance, exposure, saturation, and/or other image functions. Camera 110 and/or processor 120 may be further configured with one or more video codecs or other image processing software or drivers to capture, process, and store external independent media such as actual video from the environment 1 as well as augmented reality.

Microphone 115 may be any auditory transmission and/or reception device capable of audio pickup and/or playback. For example, microphone 115 may include an embedded speaker and/or an embedded induction microphone in a mobile device. Display 180 may be a screen, viewfinder, monitor, or any other device capable of visually displaying visual augmented reality 101. For example, display 180 may be a touchscreen on a smartphone like an iPhone or Android devices or on a tablet like an iPad or Surface, or display may be an LCD monitor or projector, for example.

Sensors 185 provide input information. For example, if display 180 is a touchscreen, sensors may be embedded multi- or single-touch capacitive sensors capable of detecting finger or stylus touch, pressure, movement, etc., with respect to display 180, during operation of device 20. Or for example, sensors 185 may be an accelerometer or magnetized compass with associated hardware or software capable of determining device orientation and/or movement, potentially with respect to display 180 during operation of device 100. Or for example, sensors 185 may be a button or an external mouse or joystick and associated hardware or software capable of controlling and determining cursor position and/or activation with respect to display 180 during operation of device 100. Sensors 180 are connected to processor 120 and can deliver sensed input information to processor 120 with respect to display 180, including cursor or contact position, duration, numerosity, pressure, movement speed, etc.

Example embodiment video device 20 may further include a communications port 140 for external wired or wireless communication. For example, communications port 140 may be an antenna configured to transmit and receive on CDMA bands, a Wi-Fi antenna, a near field communications transmitter/receiver, a GPS receiver, an external serial port or external disk drive, etc. Processor 120 may provide data from storage 130, input data from camera 110, sensors 185, microphone 115 etc., to external devices through communications port 140, as well as receive application and/or augmented reality and other information from providers through port 140. Further, communications port 140 may function as another input source for sensors 185.

Although networked elements and functionalities of example embodiment device 20 are shown in FIG. 2 as individual components with specific groupings and subcomponents, it is understood that these elements may be co-located in a single device having adequately differentiated data storage and/or file systems and processing configurations. Alternatively, the elements shown in FIG. 2 may be remote and plural, with functionality shared across several pieces of hardware, each communicatively connected at adequate speeds to provide necessary data transfer and analysis, if, for example, more resources or better logistics are available in distinct locations. Given the variety of example functions described herein, example embodiment devices may be structured in a variety of ways to provide desired functionality. Other divisions and/or omissions of structures and functionalities among any number of separate modules, processors, and/or servers are useable with example embodiment devices, including execution on a single machine or among distant, exclusive servers and processors.

Figure 3:
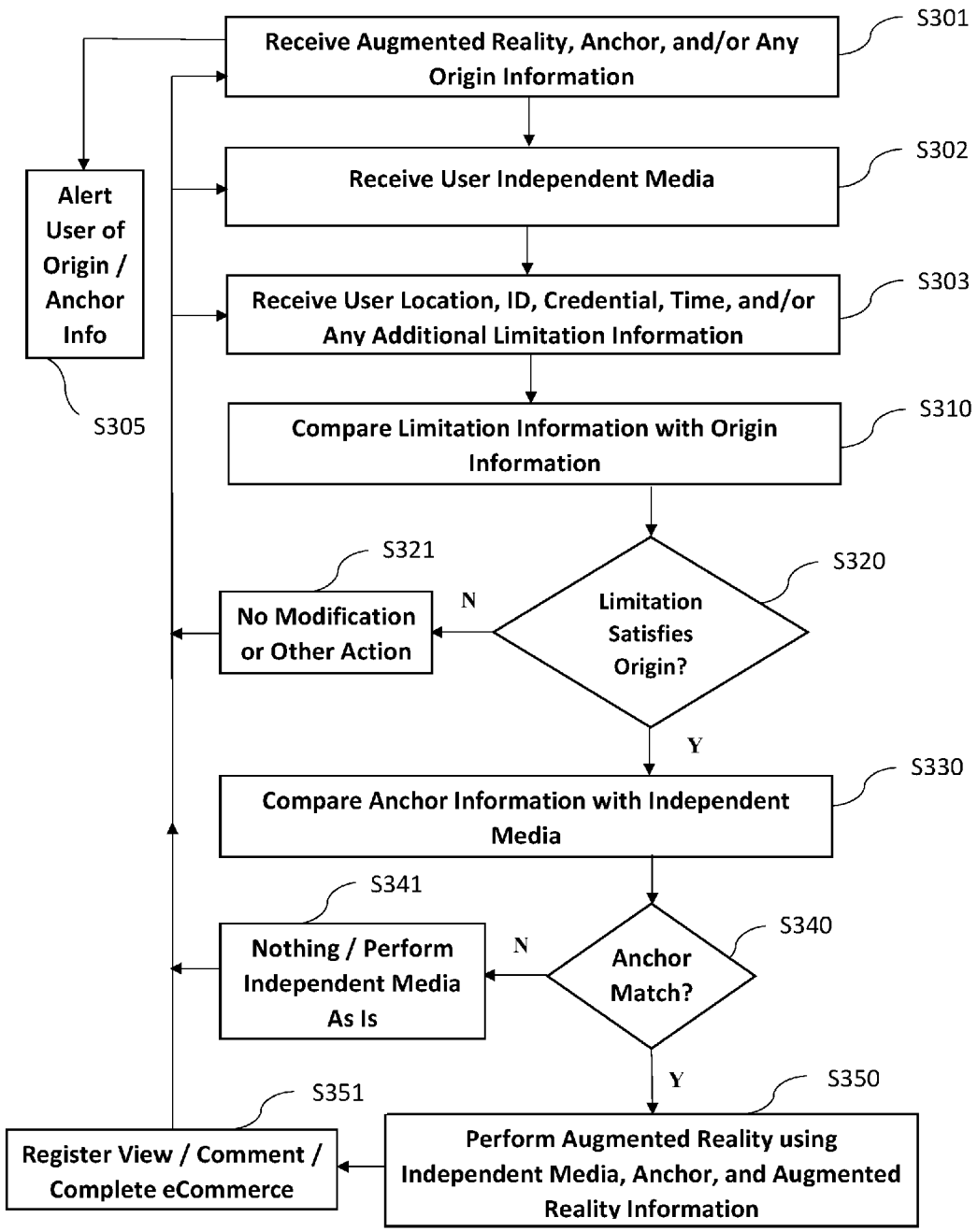
FIG. 3 is a flow chart illustrating an example method of sharing and performing augmented reality.
Figure 4:
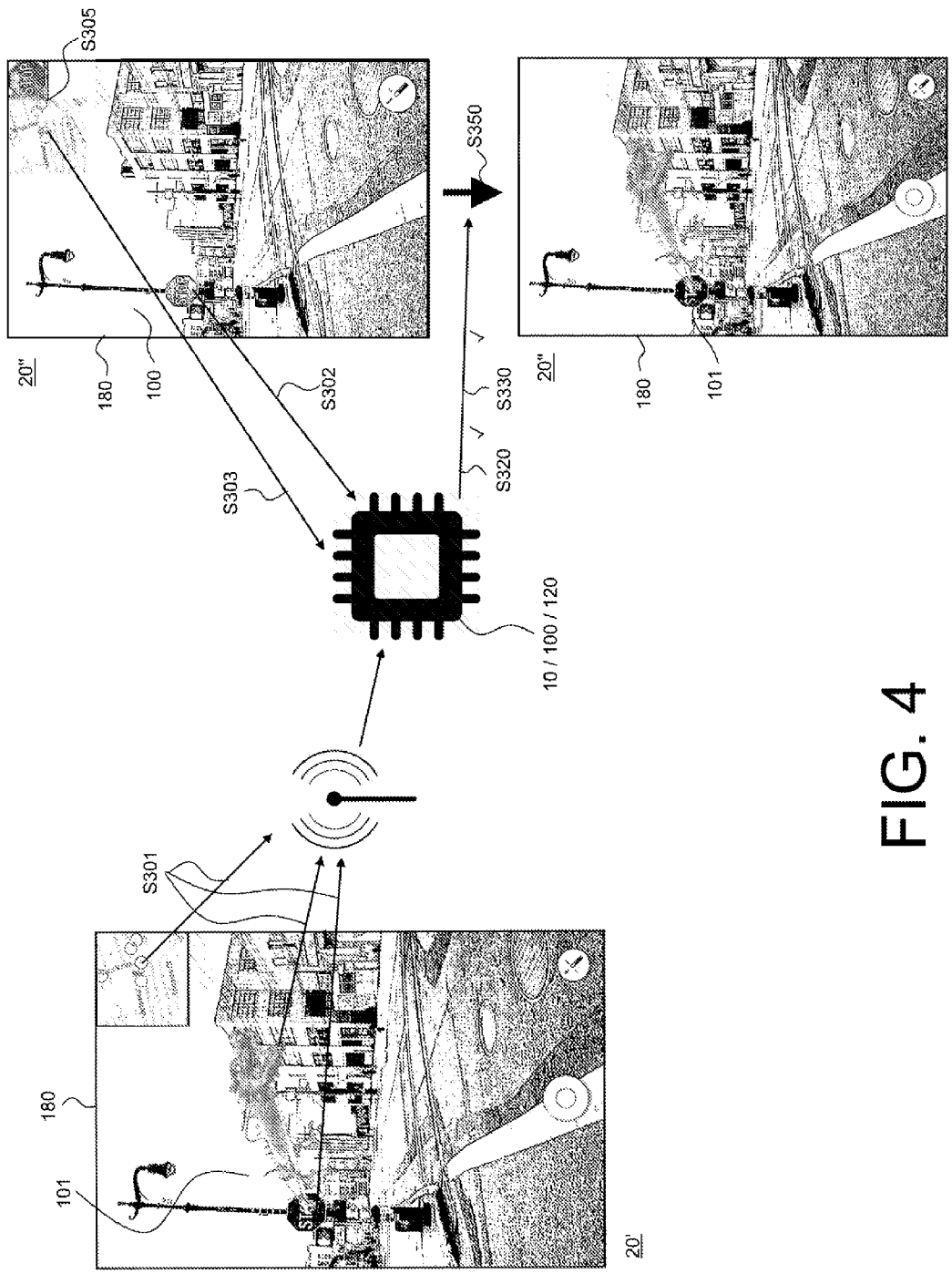
FIG. 4 is an illustration of an operations sequence in an example method of sharing and performing augmented reality.

Similarly, although the example embodiment device 20 of FIG. 2 is capable of executing and can be configured with example methods of FIGS. 4 and 5 and the example GUI of FIG. 3, it is understood that example methods are useable with other network configurations and devices, and device 20 is useable with other methods.

FIG. 3 is an illustration of an example embodiment graphical user interface 300 useable to create augmented reality and transmit or share augmented reality information. For example, GUI 300 may be useable and presentable on a screen or touchscreen 180 of communications device 20, such as on a touchscreen of a mobile phone or tablet. GUI 300 presents captured or otherwise available real-life media 1 in a format where augmented reality elements can be added to media 1. As seen in FIG. 3, media 1 can be presented at an angle against a higher-contrast background. This may permit three-dimensional or added-perspective "building" of augmented reality information on media 1.

GUI 300 is interactive, and receives user input through one or more option icons 301, 302, 303, 304.

Example Methods

FIG. 3 is an illustration of an example method of creating and/or transmitting augmented reality information. As seen in FIG. 3, in S301, augmented reality information, including or alongside anchoring information and/or origin information, is received. The receipt in S301 is by any of a user's communications device, network operator, application host, and/or other computer-processor-based device capable of electronic receipt, processing, and storage of the information in S301. The information received in S301 is created by a party selecting desired additional media that is combined with underlying real information to create augmented reality. For example, the augmented reality GUI, system, and method from co-owned application Ser. No. 15/482,670 titled "SYSTEMS AND METHODS FOR CREATING AND SHARING AUGMENTED REALITY" to Piemonte and Staake, filed herewith and incorporated by reference in its entirety, may provide a computer-processor-driven system for creating and transmitting the augmented reality information in S301. The augmented reality could be graphical, animated, audio-visual, auditory, haptic, etc., including graphics overlaid on public posters or personal photographs and videos, GUIs responsive to and overlaid on streaming audio-visuals, textual commentary on specific labels like license plates, UPC bar codes, or QR codes, tactile sensations such as haptic vibration or shock added to particular film scenes, or any other sensory media added to a real-life experience and reproducible with independent media. The augmented reality information received in S301 may be complete augmented reality, that is additional media combined with underlying real media, or may be only the additional media to be added to underlying independent media to create augmented reality.

In S301, origin information may be received, including user information, geographical information, encryption information, distribution information, routing information, timing/expiration information, event information, ecommerce or promoted status information, restrictions based on any of the forgoing, and metadata of the augmented reality and anchoring information.

Anchoring information received in S301 is data useable to trigger and position the display of augmented reality information in context with independently-captured media to perform augmented reality in a form similar to that input by the creating user of the augmented reality information. For example, anchoring information may be image, video, and/or sound information, for comparison with the independently-captured media to determine augmented reality triggering. As a further example, anchoring information may be mapping or orientation information for placement, sizing, and/or configuration of an augmented reality element on independently-captured media.

In S302, independent media is received, and the independent media is distinct from the augmented reality information. The receipt in S302 may be by a same processor or connected device to that receiving other information in example methods, configured for receipt, processing, and display of the independent media. Independent media received in S302 may be image, video, audio, vibratory and/or any other information captured and received at a communications device that can be analyzed and compared with anchor information. For example, independent media in S302 may be a live, unaltered audio-video stream 1 (FIG. 2) of surroundings of a mobile device recording the same with a camera 110 (FIG. 2). Or, for example, independent media in S302 may be a modified or enhanced photograph retrieved from memory 130 (FIG. 2).

In S303, additional limitation information may be received by a same or different connected communications device, network, etc. Additional limitation information may be location information of a device capturing the independent media, user information such as name, account number, user ID, etc., credentials such as passphrases, promotional codes, OAUTH codes, RealID information, etc., a local or absolute time and/or date of the user and/or when the independent media was captured, as well as any other limitation information such as subject matter screening or filters, age-based limitations, ecommerce authorizations, etc. Additional limitation information in S303 may be gathered automatically by a communications device, such as through GPS- or wifi-based location services, and/or manually input by a human user, such as a password input by a user.

Receipt of information in S301, S302, and S303 may occur in any order and between different or same users, communications devices, and/or other network actors. For example, using FIG. 1, any communications device 20 may receive any of the information in S301, S302, and S303, and any of network 10, application host 100, content providers 50 may receive the same or different information in S301, S302, and S303. Similarly, receipt of information in S301, S302, and S303 may be individually repeated, and/or receipt of limitation information in S303 and origin information in S301 may be omitted entirely. Moreover, information received in S301, S302, and S303 may be received in a single transmission, as a single piece of information, file, or media. For example, anchor information, augmented reality information, and user location information compatible with that received in S301 and S303 may all be present in, or determinable from, a single image or video stream, with any other mixture, combination, and/or derivability of information among that received in S301-S303 possible.

Users may be alerted of the existence (or non-existence) of anchor and/or origin information for augmented reality in S305, to encourage or aid seeking out of independent media and other conditions that match the anchor and origin information. For example, a user may be guided with a map to particular geofenced locations, or may be given a prompt for a password, or may be alerted to a cost, etc. required for presentation of augmented reality. Or, for example, a user may search by a keyword, a hashtag posted by the creating user, in a map or by inputting a zipcode, and/or by other metadata of the augmented reality, origin, and/or anchor information and see matching and available augmented reality for such a search in S305. In this way, users may be aware of specific conditions required for performance of augmented reality and may act to best comply with those conditions, potentially saving computational resources in transmitting and analyzing information among S301, S302, and S303.

Results in S305 may be transaction-based, with a user having to make a payment or satisfy another ecommerce condition, such as having a premium or paying account status, credit card on file, a number of finding credits, etc., to be shown available augmented reality in S305. Similarly, results in S305 may be screened or available based on satisfaction of origin conditions in S320, such as having a particular user account name, location, phone type, relationship with a creating user, etc., that satisfies limitation information with any augmented reality that may be suggested or alertable in S305.

As shown in S320-S351, one or more comparisons of various received information from S301, S302, and/or S303 ultimately determine if the augmented reality is performed. Because the recognition of an anchor in S340 may be resource intensive, especially among millions or more of pieces of received augmented reality and independent media information, an origin match in S310 and S320 may be performed to screen or limit any anchor analysis in S330, and potentially transmission of information from S301 and/or S302, to only eligible users or independent media providers. Origin match in S310 and S320 may also be omitted or performed after any anchor analysis.

In S310, the received user limitation information from S303 is compared for a match or indication of acceptability from the origin information received in S301. For example, origin information in S301 may be a defined, geofenced area or location check-in, user ID or social network connection, account type, time of day, password, payment status, subscription information, etc. that limits what circumstances or to whom the augmented reality is performable. Limitation information in S303 may be comparable or corresponding to origin information, such as a detected or entered user location, confirmed check-in, provided user ID, account verification, detected time, entered password, payment verification, etc. potentially from the creator of the augmented reality subject matter received in S301. Where the origin and limitation information are comparable, a match may be determined in S310. In S320, if a match or other satisfying condition between the origin and limitation information is determined, the example method may proceed to performance of the augmented reality in S350. Where the limitation information is absent or does not match the origin information, no modification with augmented reality or other performance of augmented reality may be performed in S321. A user may be informed in S321 as to a non-matching condition and/or re-prompted in S305 to seek out or enter such information to facilitate a match in S310 and S320.

Comparison in S310 may be performed at other points, with or without receipt of all or partial information from S301, S302, and S303. For example, comparison S310 may be performed upon receipt of only origin information in S301 and only limitation information in S303 alone. Where a match is determined in S320 on that information alone, additional information, such as augmented reality information in S301, independent media in S302, and/or other limitation information in S303 may then be received, so as to limit transmission requirements to situations more likely leading to performance in S350. Of course, as discussed at the outset, comparison in S310 may be performed iteratively, for potentially incremental or real-time receipts of information in S301, S302, and/or S303, so as to continuously monitor when user limitation information and origin information will match to proceed with further more resource-intensive actions in example methods.

In S330, the independent media received in S302 is compared with the anchor information in S302 to determine if and how the augmented reality information can be applied to the independent media to perform augmented reality. The matching in S330 may be a direct comparison between the independent media and anchor data such as underlying real-life media components of the augmented reality information. For example, the anchor information may include an underlying poster, QR code, street view, artwork, product or label, logo, tonal sequence, and/or song to which additional media is added to create the augmented reality, and this underlying information may be compared against the independent media to determine a match and, further, where and how the additional media is added to recreate the augmented reality in S350. The comparison in S330 may use image processing and recognition techniques, including the algorithms identified in US Patent Publication 2012/0026354 to Hamada, published Feb. 2, 2012 and US Patent Publication 2016/0004934 to Ebata et al., published Jan. 7, 2016, these documents being incorporated herein by reference in their entireties.

The matching in S330 may use anchor data independent from the augmented reality or independent media. For example, the anchor data may be a separately-received file, or NFC tag, or facial profile, or sound, etc., that identifies or describes independent media eligible for augmented reality and/or describes how augmented reality information should be added to the same. In this example, the anchor data may still be comparable to the independent media to determine eligibility for augmented reality and, if so, in S350, the exact parameters for such display of the augmented reality information in combination with the independent media.

Anchor data used in S330 may be fingerprint-type data, that is, smaller or less-resource-intensive information that is characteristic of and comparable to independent media to determine a match. Similarly, comparison methods may use simplified processes to readily identify matches among potentially large amounts of anchors and independent media, potentially using this fingerprint data. For example, in the case of image-based independent media and anchor data, the anchor data may be a smaller grayscale or edge-detected representation of the eligible independent media. The received independent media may also be reduced to a comparable grayscale or edge-detected representation. Such smaller and simplified images may be readily compared, such as using, for example, sum of squared differences, sum of absolute differences, and/or zero mean normalized cross-correlation between the pixels in the images, to determine a match, or a level of agreement within a matching threshold in S330. Other useable zero mean normalized cross-correlation among images are described in the incorporated '934 and '354 patent publications.

Or for example, independent media and anchor data may be transformed into comparable finger-print type data through a Fourier transform of a waveform signal of the anchor and independent media, highlights from the media and anchor frequency domain, detected time/space domain, other type of correlation, cepstrum or wavelet transform, and/or other detectable and comparable characteristics that may be created through image, audio, tactile, or other processing. Appropriate matching thresholds between the transformed anchor information and independent media transformed can then be used to identify matches in S330. In this way, a very high volume of anchor data and independent media (potentially continuously captured and analyzed) can be compared, even by a simpler communications device or over a slower remote communicative connection, without requiring large computing resources or time to determine an acceptable match in S330.

In S340, if the anchor does match, indicate, or can be found in the independent media, augmented reality is performed in S350. If the anchor does not match in S340, the independent media may be performed as is, or no action may be taken, but no augmented reality using the received information is performed in S341. A user may be notified of the non-match in S341 and/or prompted with information as to how to elicit a match such as through S305.

In S350, the augmented reality is performed using the received independent media, anchor information, and augmented reality information. For example, the augmented reality information may be only additional subject matter that is added to the independent media at position/orientation/timing/sizing dictated by the anchor information to replicate the augmented reality received in S301. Or, the augmented reality information may be full augmented reality having mixed underlying reality and added-in media performed to appear as the independent media with additional elements. The performance in S350 may be, for example, in real-time with capture of independent media in S302 so as to be perceived as a real-life altered reality in accordance with the augmented reality or may be performed at a later time, such as if the augmented reality is saved and/or transmitted elsewhere in response to a match in S340 and performed at that other instance.

The performance in S350 may be executed by any output device connected to a processor creating, formatting, or transmitting the augmented reality created from the received independent media, anchor information, and/or augmented reality information. Such an output device must include at least one output capable of being sensed by human senses so as to perceive the augmented reality, such as a screen 180 of example embodiment communication device 20 of FIG. 2 outputting visual imagery as augmented reality 101, speaker, tactile device, buzzer, or even a taste or smell element.

Upon performance of the augmented reality in S350, a registration of the performance may be generated in S351, such as an alert to a creator or tracking system of a number of views or other performances. Similarly, in S351, a user may comment, reply, rate, report as violating terms of use or laws, request technical support for, etc. the performed augmented reality. Still further, in S351, if payment, registration, subscription status, or other ecommerce origin information was required for performance, those options may be achieved in S351 following performance. Still further in S351, augmented reality information and any other received information may be locally and/or remotely deleted for privacy concerns. Example methods may then be repeated or looped with the same received information or one or more new pieces of information in S301, S302, and S303.

Some specific examples of implementation of the example method of FIG. 3 are discussed below. In a first example of FIG. 4, an example method performs augmented reality as an added graphic to visual or video data at particular locations. For example, augmented reality 101 is created on a first communications device 20' through its touchscreen 180, such as by a user adding a dragon image over a stop sign in the accurately-captured street scene 1 underlying augmented reality 101. First communications device 20' has the underlying image location from a location service such as GPS native to the device or input by a user. First communications device 20' further has anchor data of the stop sign for positioning, sizing, and/or orienting the added dragon of augmented reality 101 with respect to the stop sign. All this data is transmitted and received over a network as augmented reality information, anchor information, and geofencing origin information in S301.

The street scene augmented reality 101 may be received by a processor in a network 10, application host 100, communications device processor 120, and/or any other processor. Although a wireless network icon is shown to one side of processor element 10/100/120, it is understood that a processor anywhere may perform the receipt in S301. For example, the processor may be in first communications device 20' or second communication device 20", with all data transmitted to the hosting or connected device for use in example methods.

As shown in FIG. 4, second communications device 20" feeds video in real time picked up through a camera on screen 180. Second communications device 20" and first communications device 20' may have separate owners, operators, network affiliations, be operated at different times and dates, etc. Through an application installed on second user device 20" or native video display functionality, prompting or alerting in S305 may show required origin information, in this example geofenced areas where second communications device 20" must be present for performance of augmented reality 101.

Second communications device 20" captures independent media 100, including similar underlying street scenes as augmented reality 101. The independent media, here the live video captured and displayed on second communications device 20", and limitation information, here the second user's location as determined by device 20", are received by the processor in network 10 or application host 100 or even processor 120 (FIG. 2) in device 20". Such receipt in S302 and S303 may occur continuously, at discreet intervals, at instructed times by a user, etc. Similarly, receipt in S302 and receipt of augmented reality and anchor information in S301, and really any handling of the same, may occur after the successful comparison of the location of the second user device 20" with matching geofenced area in the origin information.

The processor compares the received location information of second communications device 20" with the received origin information of the first communications device 20' in S302. Upon determination that the location matches, or at least that second device 20" is within a geofenced area received as origin information with augmented reality 101 (first "√") from first device 20', the processor then compares the received independent media, here live video information 100, with the anchor data, here the stop sign, to determine if the anchor is present in S330. Upon determination that the anchoring stop sign is present in the underlying video 100 (second "√"), information of augmented reality 101—the dragon—is performed on screen 180 of second communications device 20", in the manner indicated by the anchor data—extending from the stop sign. As seen in FIG. 4, augmented reality 101 is performed on second communications device 20" in a visually similar style, with added graphical dragon extending from the stop sign in the live captured street scene.

The performing in S350 may be executed by the same processor receiving and comparing data in this example method. However, it is also understood that each receipt, comparison, authorization, performance, and performance may be executed by discreet processors under potentially separate ownership and control, with access to data required for each action in example methods. For example the processor in an application host 100 may merely authorize the performance in S350, and a processor in second communications device 20" may actually perform augmented reality 101 on second communications device 20".

Information of augmented reality 101, anchor data, origin information, as well as information of independent media 100 and user location may be encrypted, compressed, or reduced to a fingerprint for easier transmission and comparison. For example, if the processor uses a zero mean normalized cross-correlation to identify an anchor in independent media 100, simplified, black-and-white only information of the anchor stop sign and independent media 100 may be transmitted and compared in S320 and S330. Similarly, if the processor uses a Fourier transform, frequency domain, cepstrum, etc. analysis, appropriately reduced fingerprints of anchor stop sign and independent media 100 may be generated, received, and compared in S320 and S330. Particularly in this example with geofenced origin and limitation information, a high tolerance or match threshold may be used between significantly compressed or simplified data for comparison, as even a rougher image match between anchor and underlying media is a reliable match given the location matching in S310 and S320.

Although in the example of FIG. 4, a stop sign is used as a visual piece of anchor information for comparison against video containing the stop sign to determine a match and placement of the augmented reality information, it is understood that other anchor information could be used. For example, lines on the road, edges of building tops, the light post, etc. could be used alone or together as anchor information checked against the independent media. Anchor information that is particularly distinctive, such as high-edge value or high-contrast objects, or anchor information that is particularly suited for the comparison in S330, such as objects with easy image processing signals for zero mean normalized cross-correlation or object with unique Fourier transforms, may be selected and transmitted in S301 for use in the comparison in S330. A user, communications device 20', network processor, and/or other actor may select this best anchor information, and second communications device 20" may display such differently-selected anchors as heads-up images in S305.

Similarly, although in the example of FIG. 4 augmented reality information from S301 includes just a dragon image to be added to underlying actually-captured independent media 100 from S203—a street scene—to create augmented reality 101 in the performance of S350, it is understood that augmented reality 101 may include several more elements, up to the entire street scene with dragon. That is, a user may actually be viewing only received augmented reality information from S301 (the entire dragon plus street scene as a video or still image) and no elements of independent media from S302, which may be used only for triggering and/or positioning of augmented reality 101, in the performance of S350.

Although the independent media 100 of a street scene from second communications device 20" appears very similar to the underlying scene in augmented reality 101, some tolerance may be permitted in example methods, such as different angles, device orientation, distances from the stop sign, vantage of the stop sign, etc. that may still trigger the performance of augmented reality 101. The different vantage, positioning, and/or appearance of the anchor stop sign may further dictate the sizing, positioning, orientation, and other parameters of the augmented dragon element so as to preserve a similar augmented reality 101. For example, if the stop sign is larger on second communications device 20" due to a closer position, augmented reality 101 may be performed with a proportionally larger dragon. Such changes may be made in real time with modification of the independent media. For example, as second communications device 20" approaches the stop sign and it becomes larger, the augmented reality 101 on a screen of device 20" may increase the size of the dragon proportionally, while keeping the dragon positioned in a same relative position to the stop sign.

As examples of S351 in FIG. 4, upon performance in S350, the first communications device 20' may be alerted of the performance, a number of performances, users' viewing the performance, receive payment for the performance, etc. Similarly, upon performance in S350, a user of the second communications device 20" may reply, comment, rate, report, or otherwise give feedback on the augmented reality 101.

Multiple pieces of augmented reality, potentially created from several different sources, may be applicable to a same anchor, and following performance of one in S350, a next augmented reality that still satisfies the origin and anchor requirements may be performed. A viewing order, or a selection of augmented realities, may be received before performance in S350 to control the same. Still further, the various augmented realities otherwise matching a same piece of independent media in S310-S340 could be performed together or simultaneously. Still further, ecommerce options may be completed upon the performance, such as debiting a users' account an agreed-upon amount or amount specified in origin information, deducting a number of permitted views from a user's subscription, invoicing the user, all in association with second communications device 20" and/or any user account associated therewith.

The example of FIG. 4 can be iterated millions, or really any, times, with receipt in S301 occurring from numerous distinct users across the globe. Because independent media from S302 is compared in S330 against the information received in S301, from a potentially remote or distant user or at a vastly different point in time, this may be resource-intensive on any network, processor, or communications device executing all or part of example methods. The example of FIG. 4 improves resource usage by limiting the comparison in S330—the search for the stop sign anchor in the live video—to users already in the geofenced area specified by the origin information as determined by S310. In this way, in a universe of potentially many, many different pieces of augmented reality, example methods may save actual comparison in S330, and even receipt/transmission of augmented reality and anchor information in S301 and independent media in S302, for situations where independent media is most likely to result in a match in S330. Of course, additional origin limitations may be used to further screen methods. For example, a passcode or user ID may be entered into second communications device 20" in S303 as additional user limitation information and compared against received origin information from S301 as another check before receiving or comparing independent media and anchor data.

Another example uses a study group or book club. In this example, a leader or offering member takes a picture of a page of a textbook or novel on their communications device and adds notes to the margins, as well as highlighting the text as augmentation of the image of the page. The augmentation may be executed through an application on the leader's communications device configured to execute at least parts of example methods. The creating leader then sets a list of other users, here, the other members of the group or club, as users with permission to perform the augmented reality, here, the notes added to the text page. This list of users may be identified by user ID in the application, phone number, social media profile etc.; the list may be identified by a sharing option whereby the augmented reality is shared through a social media platform or listserve to a specific group, such as followers, Facebook group members, email chain, etc.

The application then transmits the augmented reality information along with anchor information and origin information over a network to an application host. In this example, the application sends the highlight and note visual information as the augmented reality information, the underlying page as the anchor information, and the invited/permitted users from the book club or study group as additional origin information. The anchor information may be an image of the underlying page itself, or fingerprint-type data of the page image that is smaller, along with positional information for the notes and highlighting with respect to the underlying page. Of course, the augmented reality, that is, the image of the page with the highlighting and notes may be used as both augmented reality information and anchor data, with the application or other processor extracting identifying features for performance of the augmented data from the page image. In another example using email or direct communications, the highlight and note visual information as augmented reality information and the underlying page as the anchor information may be sent directly to the study group member's emails as a file(s) to be performed on their devices.

The application host may receive all the data from the creator/leader of the book club in S301. The data may further be transmitted to communications devices of only the identified users, which receive it as S301, depending on how data is to be distributed in example methods. The other identified user members of the book club may receive a notification, such as through a same application installed on their communications devices, of available augmented reality, because their user name or other identifying information, such as phone number, user ID, group membership, etc. matching those specified by the creating leader in S305. A notification may be displayed or otherwise communicated to these other members, such as through an image of the anchor data—the underlying page—or description of the same, such as "notes available for augmented reality of page 87," through communications devices or otherwise in S305.

The other members may then, through their communications device, take a picture of, record, live stream, etc. the page in question through a camera/screen functionality, potentially through the application and/or a native function of the communications device. This independent media may be sent to the application host, which receives it in S302, potentially along with user ID or other matching information to identify the user as limitation in formation in S303. It is possible that the receipt of the image on the user's communications device itself is the receipt in S302, and all other information and comparisons of example methods may be sent to, and performed locally on, that device. Similarly, the independent media, the page picture, may not be received in S302 until after the capturing user has been verified as an identified member of the book club in S310 and S320 "Y"—in order to conserve the amount of data needing to be received and compared.

The user member's captured page is then compared with the anchor data from the creating leader in S330, at the application host, on the user's communications device, or at some other computer processor properly configured, by using image recognition between the anchor and independent media. In S330 and S340, recognizing the same page as that augmented by the creating leader, the augmented reality is performed for the group member in S350. For example, the screen of the group member's device may display the underlying page with the notes and highlights added thereto in the same positioning, proportion, color, etc. as created by the leader. When the user turns the page or captures different media, the augmented reality may then be discontinued or removed in S341, as the anchor no longer matches the independent media in S340.

As seen, example methods may thus be used to share commentary, description, art, access, tagging, etc. in the same sensed context of underlying subject matter. The underlying subject matter may be unique and/or only at a specific location, or may be mass-replicated at several different locations, with each potentially triggering augmented reality. Creating and receiving users may limit augmented reality performance to specific users, locations, times of day, dates, group members, number of views, payment status, etc. in order to selectively share and control such content. Similarly, users may rate, reply to, report, share, tip, add view indicators, and/or comment on performed augmented reality to potentially guide creators toward better practices, avoid or remove harmful or illegal content, make others aware of particularly useful or interesting augmented realities, show support, etc.

A final specific implementation of example methods may use sound as well as visuals. A product supplier may publish a commercial advertisement for a particular product, and the commercial may be an audio-visual performance broadcast on TV, as web ads, etc. The supplier may provide to an application host augmented reality information and anchor information associated with the commercial advertisement in S301. In this example, the anchor information may be a unique sound sequence of the advertisement, and the augmented reality may be additional audio feedback in sync with the advertisement, such as vocally providing additional information about the product featured, making jokes about the advertisement in a self-deprecating manner, adding an audio track to the advertisement, providing humorous sound effects, etc. The augmented reality may also include visual information, such as further textual descriptions, web links, humorous imagery or cartoons of the product, etc., that are synched in time with the advertisement.

The product supplier may also furnish origin information, such as user demographic information and/or event limitation. For example, the supplier may desire the augmented reality to be performed only for users in a particular age range or home market. The supplier may also desire the augmented reality to be performed only in contemporaneous or authentic settings, such as a first run of a commercial or at a particular convention, and not during later reruns or after the event. Origin information supplied in S301 may include these restrictions, which can be compared against user type, location, time, an event being active, a user being checked-in to an event, etc.

The application host and/or content provider controlling the same and potentially a communications device application may receive this augmented reality, anchor, and/or origin information from the product supplier in S301 and/or may push it to individual communications devices in S301. The providing of augmented reality information and anchor information to communications devices from the application host may occur after a satisfactory comparison of origin and limitation information in S310 and S320. For example, the application host might only provide the augmented reality and/or anchor information after determining that a communications device is being operated at a time or at an active event when a triggering commercial is known to be live and in its first run. Similarly, the augmented reality and anchor information may be pushed to communications devices regardless, and this determination of limitation satisfying origin information in S310 and S320 may be executed at any time prior to actually performing the augmented reality.

The product supplier may pay the application host and/or developer to provide the augmented reality information to users experiencing the commercial; for example, payment may be arranged for each end user performing the augmented reality. Users of communications devices may then be prompted to activate their application or otherwise enable receipt of independent media during the advertisement in S305, such as by a pop-up or text alert that the advertisement features augmented reality. The advertisement itself may make users aware that augmented reality of the advertisement is available for performance.

As the commercial plays, such as on their TV, radio, or communications device, the user may activate or present their communications device to receive the audio of the advertisement in S302, which is compared against the anchor data of the unique sounds of the advertisement in S330. Such comparison may be made using a comparison of sound waves received and present in anchor data, within a matching threshold, by comparison of frequency domains of the audio signals, and/or any other type of audio identification. Upon detecting the audio of the commercial in S340, the user's communications device may then play back the augmented reality information —additional audio commentary and/or visual sequences at times and speeds in sync with the advertisement—on its speaker and/or screen in S350. The combined advertisement with additional audio and/or visual is an augmented reality that may provide additional information or user experience. The product developer may then be debited or charged an amount for each performance of the augmented reality in S351. As such, it is possible to use example methods in the context of any perceivable augmented reality, not just visual information.

Actions throughout example methods may include user authentication, data verification, privacy controls, and/or content screening. For example, in example methods, users may never be provided with identifying information of the one another, such that a party creating augmented reality content and/or a party consuming the same may remain anonymous to the other. For example, data may be encrypted and not retained at one or all points in example methods, such that there may be no discoverable record of augmented reality, independent media, origin and/or limitation information in regard to such content, existence, performance, etc. For example, a third party or application host may sample or review some or all augmented reality information for potentially harmful, wasteful, or illegal content and remove the same, as well as monitor user feedback to identify such content. For example, a monitoring or feedback functionality may process augmented reality information to identify AR crimes and other problems identified in Lemley, "Law, Virtual Reality, and Augmented Reality," Mar. 15, 2017 (available at ssrn.com/abstract=2933867), incorporated herein by reference in its entirety, and tag or remove augmented reality information containing the same.

As to verification, example methods may take advantage of a user login model requiring user authentication with a password over a secured connection and/or using operating-system-native security control and verification on communications devices, to ensure only verified, permitted human users access example methods and potentially user accounts. Example methods may also require payment verification, such as credit card or bank account authentication, to verify identity and/or ability to pay before allowing users to participate in sending or receiving augmented reality in example methods. Example methods may further use location and input verification available through operating system controls or other network functionalities, potentially in combination with user feedback, to prevent or punish location spoofing, user account compromising, bot access, and/or harassment or waste in example methods.

Some example methods being described here, it is understood that one or more example methods may be used in combination and/or repetitively to produce multiple options and functionalities for users of communications devices. Example methods may be performed through proper computer programming or hardware configuring of networks and communications devices to receive augmented reality, origin, and limitation information and act in accordance with example methods, at any number of different processor-based devices that are communicatively connected. Similarly, example methods may be embodied on non-transitory computer-readable media that directly instruct computer processors to execute example methods and/or, through installation in memory operable in conjunction with a processor and user interface, configure general-purpose computers having the same into specific communications machines that execute example methods.

Example methods and embodiments thus being described, it will be appreciated by one skilled in the art that example embodiments may be varied through routine experimentation and without further inventive activity. For example, although a direct comparison between anchor and captured video input may be used to determine a match, it is understood that vastly more complex analysis and input may be used to determine whether augmented reality should be performed. Variations are not to be regarded as departure from the spirit and scope of the exemplary embodiments, and all such modifications as would be obvious to one skilled in the art are intended to be included within the scope of the following claims.

What is claimed is:

1. A method of handling contextual augmented reality in a computer processor-based system, the method comprising:
  receiving, with the computer processor, augmented reality information and anchor information for the augmented reality information, wherein the augmented reality information and the anchor information are received from a first user communications device;
  receiving, with the computer processor, media independent of the augmented reality information and the anchor information, wherein the media is captured by a second user communications device at a different time from creation of the augmented reality information, and wherein the first user communications device and the second user communications device are separately owned;
  comparing, with the computer processor, the anchor information with the media;
  if the media is identified by the anchor information based on the comparing, performing the augmented reality information synchronized in the media in a manner defined by the anchor information.

2. The method of claim 1, wherein,
  the anchor information identifies a first visual scene captured by a communications device and a position in the first visual scene,
  the media is a second visual scene captured by a communications device,
  the comparing compares the first visual scene and the second visual scene to determine if they are the same scene,
  the augmented reality information is graphical, and
  the performing performs the augmented reality information in the second visual scene at the position.

3. The method of claim 2, wherein the comparing includes zero mean normalized cross-correlating pixels of the first visual scene with pixels of the second visual scene to determine if the images correlate within a match threshold.

4. The method of claim 2, wherein the computer processor is in a mobile communications device having a camera capturing the second visual scene, and wherein the performing displays the augmented reality information in real time with the captures second visual scene on a screen of the mobile communications device.

5. The method of claim 1, further comprising:
  receiving, with the computer processor, origin information limiting circumstances in which the augmented reality information may be performed;
  receiving, with the computer processor, limitation information of a user communications device; and
  comparing, with the computer processor, the limitation information with the origin information to determine if the user communications device satisfies the circumstances, wherein the performing is executed only if the user communications device satisfies the circumstances based on the comparing.

6. The method of claim 5, wherein the origin information is at least one of a geographic area containing subject matter identified by the anchor information and a span of time containing the subject matter identified by the anchor information, wherein the limitation information is at least one of a geographic position of the user communications device and a time of capture of the media, and wherein the circumstances are satisfied if at least one of the geographic position is within the geographic area and the time is within the timespan.

7. The method of claim 1, wherein the augmented reality information is a graphical user interface responsive to the media, and wherein the performing is executed in real time with the media being captured.

8. The method of claim 1, wherein the augmented reality information and the media are visual, and wherein the augmented reality information is sized, positioned, and moved in the media in a manner defined by the anchor information.

9. The method of claim 1, further comprising:
  receiving, with the computer processor, origin information limiting circumstances in which the augmented reality information may be performed;
  notifying a user of the origin information; and
  if the performing is executed by the user, gathering at least one of feedback and payment from the user.

10. A method of augmenting a visual performance on a communications device, the method comprising:
  receiving, with the communications device, visual information to be added to create augmented reality and anchor information including a description of eligible media and a placement of the visual information in the eligible media, wherein the visual information and the anchor information are received from a separately-owned communications device;
  determining, with the communications device, a geographic position of the communications device,
  receiving, with a camera of the communications device, independent visual media, wherein the media is captured at a different time from creation of the visual information and anchor information;
  if the description matches the independent visual media and if the geographic position of the communications device is within a geographic area to which performance of the augmented reality is limited, performing the visual information in the independent visual media at the placement in the anchor information.

11. The method of claim 10, wherein the communications device is mobile, and wherein the determining is executed with at least one of GPS information and WiFi information through a service native to an operating system of the communications device.

12. The method of claim 10, further comprising:
  notifying, with the communications device, a user of at least one of the description and the geographic area.

13. The method of claim 10, wherein the independent visual media is a live video captured by the camera of the communications device, and wherein the performing is executed in real time with the live video on a screen of the communications device.

14. The method of claim 10, further comprising:
  receiving, with the communications device, origin information including the geographic area; and
  comparing, with the communications device, the origin information with the geographic position of the communications device.

15. The method of claim 14, wherein the origin information includes additional user identification limitations, the method further comprising:
  receiving, with the communications device, additional user identification, wherein the comparing further includes comparing the additional user identification with the additional user identification limitations, wherein the performing is executed only if the additional user identification satisfies the additional user identification limitations.

16. The method of claim 10, further comprising:
comparing the description with the independent visual media, wherein the comparing is performed only if the geographic position of the communications device is within a geographic area to which performance of the augmented reality is limited.

17. The method of claim 10, wherein the determining the geographic position of the communications device and the receiving the independent visual media are continuously repeated if the description does not match the independent visual media or if the geographic position of the communications device is not within the geographic area to which performance of the augmented reality is limited.

18. A processor-based network of communications devices for sharing and performing augmented reality, the network comprising:
a first user communications device connected to the network;
a second user communications device connected to the network;
an application host connected to the first user and the second user, wherein the application host is configured to,
receive, from the first user communications device, augmented reality information, anchor information for the augmented reality information, and origin information limiting circumstances in which the augmented reality information may be performed;
receive, from the second user communications device, limitation information of the second user communications device;
compare the origin information and the limitation information to determine if the second user communications device satisfied the limited circumstances; and
if the second user communications device satisfies the limited circumstances based on the comparing, transmitting the augmented reality information and anchor information to the second user communications device so that the second user communications device can perform the augmented reality information synchronized in media captured by the second user communications device in a manner defined by the anchor information.

19. The network of claim 18, wherein the application host is further configured to,
receive the media captured by the second communications device, and
compare the anchor information with the media to determine and match, wherein the transmitting the augmented reality information and anchor information to the second user communications device is executed only if a match is determined by the comparing.

* * * * *